(12) United States Patent
Gutt

(10) Patent No.: US 11,664,611 B2
(45) Date of Patent: May 30, 2023

(54) HOLDER FOR A PROTECTIVE CONDUCTOR AND CABLE TRAY WITH SUCH HOLDER FOR A PROTECTIVE CONDUCTOR AND PROTECTIVE CONDUCTOR SET

(71) Applicant: OBO BETTERMANN PRODUKTION DEUTSCHLAND GMBH & CO. KG, Menden (DE)

(72) Inventor: Wolfgang Gutt, Menden, DE (US)

(73) Assignee: OBO BETTERMANN PRODUKTION DEUTSCHLAND GMBH & CO KG, Menden (DE)

( * ) Notice: Subject to any disclaimer, the term of this patent is extended or adjusted under 35 U.S.C. 154(b) by 184 days.

(21) Appl. No.: 17/310,476

(22) PCT Filed: Mar. 9, 2020

(86) PCT No.: PCT/EP2020/056228
§ 371 (c)(1),
(2) Date: Aug. 5, 2021

(87) PCT Pub. No.: WO2020/182738
PCT Pub. Date: Sep. 17, 2020

(65) Prior Publication Data
US 2022/0384968 A1    Dec. 1, 2022

(30) Foreign Application Priority Data
Mar. 13, 2019   (DE) .......................... 202019101428.8

(51) Int. Cl.
*H01R 4/64*    (2006.01)
*H01R 4/36*    (2006.01)
(Continued)

(52) U.S. Cl.
CPC .............. *H01R 4/646* (2013.01); *H01R 4/36* (2013.01); *H01R 4/4809* (2013.01); *H01R 11/09* (2013.01); *H02G 3/0456* (2013.01)

(58) Field of Classification Search
None
See application file for complete search history.

(56) References Cited

U.S. PATENT DOCUMENTS

| | | | |
|---|---|---|---|
| 4,029,384 | A | 6/1977 | Reinwall, Jr. |
| 4,806,108 | A | 2/1989 | Meinhardt |
| 2018/0045335 | A1 | 2/2018 | Martin |

FOREIGN PATENT DOCUMENTS

| | | |
|---|---|---|
| DE | 10332214 A1 | 2/2005 |
| EP | 2835869 A1 | 2/2015 |

OTHER PUBLICATIONS

International Search Report (ISR) dated Jun. 12, 2020 in parent international application PCT/EP2020/056228.
(Continued)

*Primary Examiner* — Ross N Gushi
(74) *Attorney, Agent, or Firm* — Polson Intellectual Property Law, PC; Margaret Polson; Christopher Sylvain

(57) ABSTRACT

An earth wire holder for a cable tray having two spaced-apart side bars, wherein the earth wire holder is in the form of a spring clamp having a side bar receptacle enclosed by two mounting arms for connecting the spring clamp to the upper edge of a side bar and having an undercut earth wire receptacle enclosed by two holding arms, wherein, when the spring clamp is mounted on the upper edge of the side bar, the mounting arms bear against the side bar under prestress, and the spacing between the holding arms in the section thereof enclosing the earth wire receptacle is smaller than the diameter of the earth wire to be introduced therein.

16 Claims, 3 Drawing Sheets

(51) Int. Cl.
    H01R 4/48      (2006.01)
    H01R 11/09     (2006.01)
    H02G 3/04      (2006.01)

(56) References Cited

OTHER PUBLICATIONS

Written Opinion (WO) of the International Searching Authority dated Jun. 12, 2020 in parent international application PCT/EP2020/056228.
Schneider. "Schneider Electric" Oct. 15, 2018 (Oct. 15, 2018), pp. 1-340. Retrieved from the Internet: https://www.merten.de/fileadmin/import/files/merten/katalog/Schneider_Electric_Ka talog_2019_Digital.pdf (retrieved on May 20, 2020) XP055697595. [Per MPEP 609.04(a)(III), concise explanation of relevance provided by English translations of the ISR and WO in parent international application PCT/EP2020/056228].
Examination report dated Mar. 15, 2023 in related European patent application No. EP20710888.7.

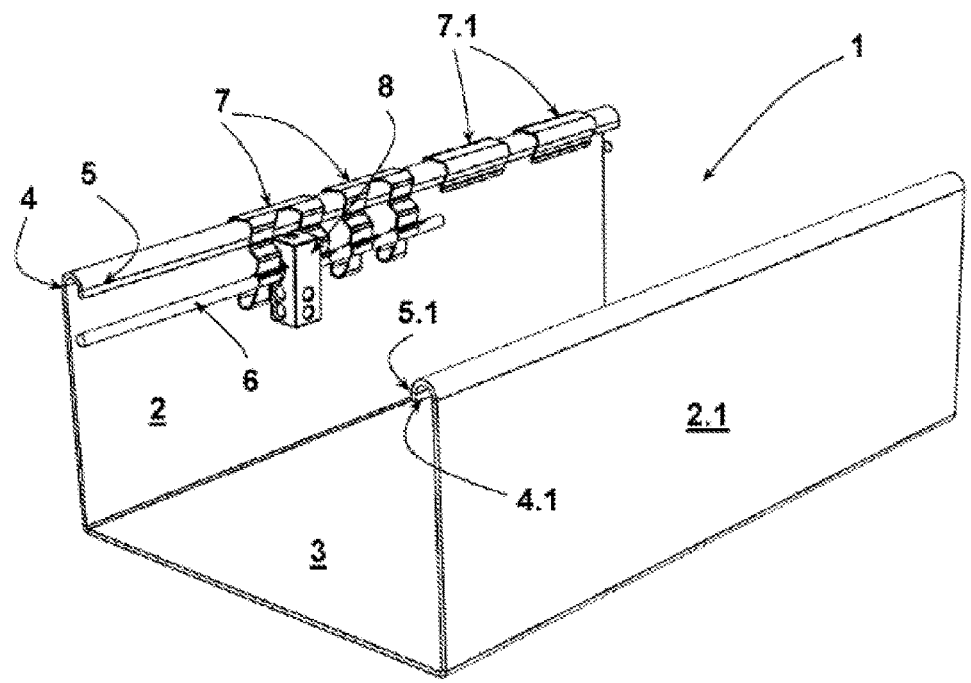
Fig. 1
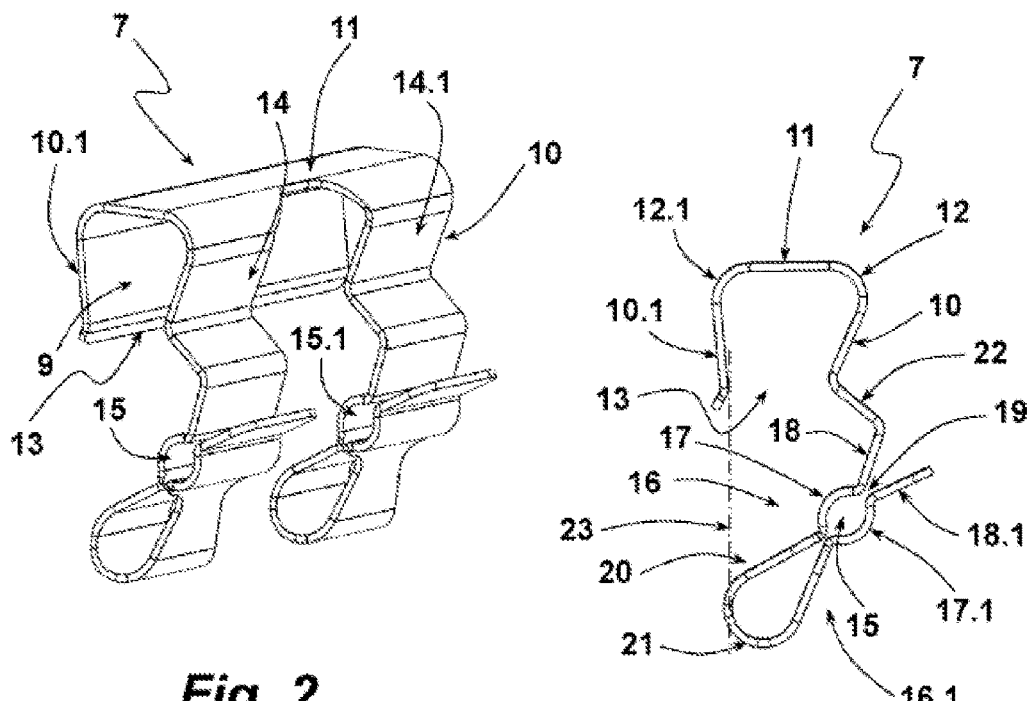
Fig. 2
Fig. 3

HOLDER FOR A PROTECTIVE CONDUCTOR AND CABLE TRAY WITH SUCH HOLDER FOR A PROTECTIVE CONDUCTOR AND PROTECTIVE CONDUCTOR SET

BACKGROUND

The present disclosure relates to an earth wire holder for a cable tray with two spaced-apart side bars. Also described are a cable tray having at least one earth wire holder of this kind and an earth wire kit.

Cable trays are used for running electrical lines and other cables. Using a plurality of such cable trays, wire support systems (also referred to as cable runs) are formed, primarily in order to run flexible lines in buildings. The cable trays are fastened on the wall or ceiling side by means of appropriate holders. Such cable trays are typically made of sheet steel. In many cases, the sheet steel is galvanized for corrosion protection. Such cable channels can be closed by a cover. In the case of cable trays produced from sheet steel, said cable trays can be designed as closed or provided with holes. Cable channels can also be designed as so-called mesh trays. Other designs also exist for providing such line guide channels. In the context of these designs, all the tray parts used for the construction of cable support systems are referred to as cable trays in the context of these designs.

Cable trays comprise two spaced-apart side bars. In many cases, the side bars are connected together by a bottom. In a cable tray made of sheet steel, said cable tray is typically formed from a single plate. In other designs, the side bars are connected together by stays. In many cases, the cable trays made of metal also take on a potential equalization function in addition to their support function. Cable support systems which consist of a plurality of such cable trays are electrically conductively connected to one another if the cable support system is to have such a functionality. Application cases exist, in which it is desired that the cable tray or the cable support system constructed from a plurality of such cable trays can also assume an earth wire functionality.

For the cable channel to be able to take on an earth wire function, it is necessary to establish an additional earth wire, since the electrical conductivity of the cable trays typically made of sheet steel is not sufficient to satisfy the requirements of earth wires. Obviously, this applies even more if the cable trays are plastic parts. For this purpose, as earth wire, an earth wire made of copper rope is mounted on a cable support system which is to have an earth wire functionality. For mounting the earth wire on such a cable tray, earth wire holders are used. Said earth wire holders are brass parts designed as connection terminals and usually with cuboid geometry. For connecting such a connection terminal to the side bars of a cable tray, it is then necessary to drill through the side bar at appropriate sites, to accordingly arrange the connection terminal, and then to brace said connection terminal with respect to the side bar using a screw. It is necessary to drill the mounting opening into the side bar, since cable channels with an earth wire function are in most cases designed as closed cable trays. Such a connection terminal designed as earth wire holder has an earth wire receptacle for the insertion of the earth wire. A clamping means associated with the connection terminal is used for clamping the earth wire within the earth wire receptacle. The earth wire itself has no insulation, so that, in this way, the electrical contact between the earth wire and the cable tray is made at the same time if the cable tray is a cable tray made of metal. This should generally be the case for the applications in question.

The connection terminals are mounted with a regular spacing of approximately 1 meter on the cable tray or on the cable support system. In curved sections or corner formations, the connection terminals must be arranged with clearly smaller spacing from one another.

The connection terminals have connection means enabling the earth wire of machines to be connected thereto. To that extent, such an earth wire connected to a cable tray or to a cable support system consisting of a plurality of cable trays represents a special wire supported by the cable support system. Even if cable support systems equipped with such an earth wire satisfy the requirements for its earth wire function, it would nevertheless be desirable if mounting of such an earth wire were simplified. As a result of the generally necessary introduction of a mounting bore and the mounting of the connection terminals, mounting is generally complicated. In particular during drilling it must be ensured that no drilling chips remain within the cable tray, which could damage the insulation of electrical lines run therein. This may in fact be possible during the mounting of the earth wire when the cable trays are not yet mounted. However, if lines have already been laid in the cable support system and the earth wire is mounted only subsequently, it must be ensured that to the extent possible no drilling chips reach the lines already located in the cable tray or the spaces in between the lines.

SUMMARY

Proceeding from this background, an aspect of the present disclosure therefore is to further develop an earth wire holder for a cable tray in order to simplify the equipping of a cable tray with an earth wire.

This is achieved by an earth wire holder for a cable tray with two spaced-apart side bars, wherein the at least one earth wire holder is in the form of a spring clamp having a side bar receptacle enclosed by two mounting arms for connecting the spring clamps to the upper edge of a side bar and having an undercut earth wire receptacle enclosed by two holding arms, wherein, when the spring clamp is mounted on the upper edge of the side bar, the mounting arms bear against the side bar under prestress, and the spacing between the holding arms in the section thereof enclosing the earth wire receptacle is smaller than the diameter of the earth wire to be introduced therein.

This earth wire holder is designed in the form of spring clamps. Said spring clamps have a side bar receptacle which encloses the upper edge of the side bar, on which the spring clamp is mounted. Mounting of the spring clamp, which is preferably made of a spring steel, without a tool is easily possible. The side bar receptacle of such a spring clamp as earth wire holder is enclosed by two mounting arms which, when the spring clamp is mounted, bear against the side bar under prestress. The mounting arms are typically connected to one another by a web, by means of which the mounting depth of the spring clamp with respect to the height of the side bar is at the same time limited. With spring clamps mounted on a side bar, according to a preferred design, the web bears against the upper edge of the side bar. In this way, an electrical contacting between the spring clamp and the side bar and thus the cable tray, if it is made of metal, as should generally be the case, is provided at least via the mounting arm bearing against the side bar under prestress. If a web of the above-mentioned type, which connects the mounting arms of such a spring clamp, is provided, electrical contacting also occurs by the contacting application of the web on the upper edge of the side bar. The prestress, by which the mounting arms act on the upper edge of the side bar, with spring clamp mounted, not only ensures the contact pressure required for electrical contacting but at the same time ensures a secure holding of the spring clamp on the upper edge of the side bar. The spring clamp itself is adapted, with regard to the design of the mounting arm and thus of its side bar receptacle, to the upper edge of the cable tray. If such a cable tray has a formed eye, the side bar receptacle is designed with corresponding width. In order to generate the necessary prestress, the smallest spacing of the two mounting arms from one another, when not placed on the upper edge of a side bar, is smaller than the width of the complementary side bar section, that is to say approximately of the formed eye against which the mounting arms bear when mounted on the upper edge of the side bar.

In addition to the side bar receptacle, such a spring clamp designed as earth wire holder has at least one earth wire receptacle. Said earth wire receptacle is enclosed by two holding arm sections. The earth wire receptacle is used for holding an earth wire, for example, a copper rope provided as earth wire. The holding arms, like the mounting arms of the spring clamps, due to the material of the spring clamp, are also adjustable in a spring elastic manner with respect to one another. If no earth wire is inserted in the earth wire receptacle, the spacing of the holding arms from one another in the area of the earth wire receptacle is smaller than the diameter of the earth wire introduced or to be introduced therein. This ensures that the holding arms act with prestress on the lateral surface of the earth wire. This prestress is used not only for the secure holding of the earth wire but also for providing electrical contacting if necessary.

According to an advantageous design of such a spring clamp, the earth wire receptacle is formed on the side bar receptacle. Here, it is provided that one mounting arm of the side bar receptacle extends into a holding arm of the earth wire receptacle. In such a design, the earth wire receptacle is thus at a certain distance from the upper edge of the side bar. This is advantageous for closing the cable tray with a cover, which may be advantageous under some circumstances. In such a design, the possibility exists of forming the spring clamp so that, when it is mounted on the upper edge of a side bar, said spring clamp is braced against the side bar by its holding arm closer to the side bar, so that said holding arm bears against the side bar under a certain prestress. Thereby, not only is an additional electrical contacting site provided but also the spring clamp is then better secured on the side bar by this additional bracing.

In order to facilitate the insertion of an earth wire into the earth wire receptacle, the holding arms each have a setting arm section. Here, it is provided that the spacing between the two setting arm sections is reduced in the direction of the inlet of the earth wire receptacle. Thus, these inclined setting arm sections are used as setting surfaces for widening the inlet of the undercut earth wire receptacle during insertion of an earth wire.

In order to bring about the desired elastic movability of the two holding arms with respect to one another, the holding arms are connected to one another, for example, by a clamp spring section designed in the shape of an arc.

In many cases, such a cable tray, in particular if it is made of metal, will have an eye on the upper edges of its side bar. The side bar receptacle, just like the earth wire receptacle, is typically undercut. If the spring clamp is to be connected to a side bar having an eye, the mounting arm which comes to bear against the outer side of the eye is preferably more inclined with respect to the plane of the side bar (of the vertical) than the other mounting arm. Thereby, a certain engaging under the eye by the mounting arm is brought about if the side bar receptacle has sufficient depth in order to be able to completely receive the eye.

In this cable tray, the functionality of holding the earth wire is separate from the functionality of connecting earth wires to the earth wire mounted on the cable tray side. Therefore, in this cable tray, a connection terminal for producing a connection between the earth wire mounted in the cable tray and an earth wire to be connected thereto only needs to be mounted where such a connection is in fact also necessary. In addition, the connection terminal can be positioned at any site, and in particular also independently of the spring clamps, on the earth wire held on a side bar of the cable tray.

According to a design, such a connection terminal has a laterally open earth wire receptacle. This opening is open in the direction of the adjacent side bar. The connection terminal in addition has a clamping means, by means of which the earth wire introduced into the earth wire receptacle is clamped. Not only is a permanently effective electrical contacting established thereby but also the connection terminal is at the same time secured in longitudinal extension of the cable tray or of the earth wire running therein.

In a design of such a spring clamp, the portion of the spring clamps which forms the earth wire receptacle is designed as forked. Thus, such a spring clamp has two earth wire receptacles which are spaced apart in longitudinal extension of the cable tray or of the earth wire. In such a design, it is advantageous that, due to the small width of the fork extensions of the spring clamp which form the earth wire receptacle, in each case only a small opening force needs to be exerted in order to be able to insert an earth wire in the respective earth wire receptacle. By means of these two earth wire receptacles, a reliable clamping of an earth wire inserted in the earth wire receptacles is additionally improved. In a preferred design of such a spring clamp, the width of the gap, thus the spacing between the two fork extensions, is greater by a necessary clearance than the associated width of a connection terminal. In such a design, a connection terminal can be mounted between the fork extensions of such a spring clamp. By securing the earth wire in the two earth wire receptacles immediately adjacent to the connection terminal, when the connection terminal is mounted between the fork extensions, said fork extensions are additionally secured in transverse direction with respect to the plane of the side bar. Such a design of the spring clamp and the mounting of a connection terminal between the fork extensions can be used in order to lock, by means of the connection terminal, a spring clamp on the upper edge of a side bar having an eye. This is possible if the connection terminal engages under the front surface of such an eye facing the underside edge of the cable tray. With such a fastening of the spring clamp on the upper edge of a side bar, disassembly would only be possible if the mounting arms are bent correspondingly widely. A simple pulling off of the spring clamp from the upper edge of a side bar designed in this manner is effectively prevented by such a locking body provided by the connection terminal.

As clamping means, such a connection terminal can have, for example, a clamping screw designed as a set screw. Other clamping means are also possible.

The above description of the cable tray equipped with an earth wire and of the earth wire holder designed in the form of a spring clamps clearly shows that mounting of an earth wire on a cable tray or on a cable support system is much simpler and in particular also possible without a tool. Here, the spring clamps can be mounted at any site and also be removed simply, since they are mounted on the upper edge of a side bar, without taking into account holes in the side bar. It is also crucial that no drilling chips are produced during mounting, simply because a side bar opening is not necessary for passing a screw fastener through.

In this design, depending on the construction and orientation of the spring clamps, the earth wire can be run within a cable tray or else also outside of said cable tray. It is understood that earth wires can be mounted on the inner side and/or also on the outer side with respect to a side bar. For this purpose, spring clamps can be used, which have an earth wire receptacle on only one side or two spaced-apart earth wire receptacles in the case of a forked earth wire receptacle. If, from the start, an earth wire mounting is envisaged on both the inner side with respect to the side bar and also on the outer side, the spring clamps can also have, as extension of the two mounting arms, in each case one or in the case of a forked design also two earth wire receptacles.

BRIEF DESCRIPTION OF THE DRAWINGS

The following description is provided in reference to the accompanying figures based on embodiment examples, wherein:

FIG. 1 shows a perspective view of a section of a cable channel with an earth wire mounted thereon, FIG. 2 shows a perspective view of a spring clamp used as earth wire holder, FIG. 3 shows a side view of the spring clamp of FIG. 2.

DETAILED DESCRIPTION

Figure 4:
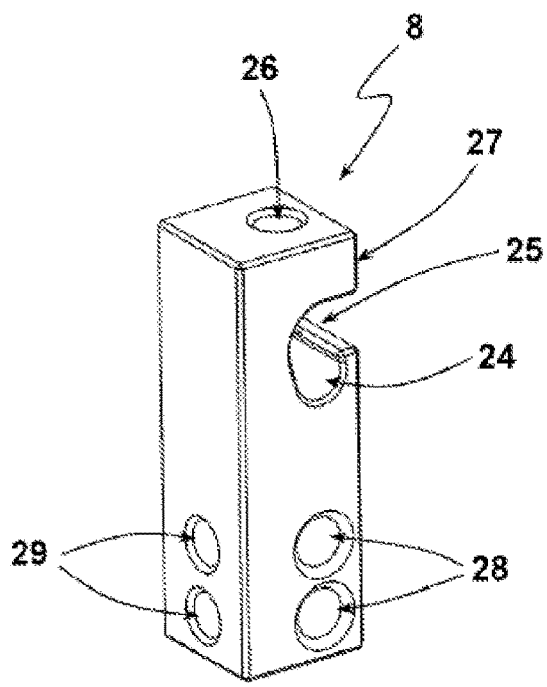
FIG. 4 shows a perspective view of a connection terminal for providing an earth wire branch line.

A cable tray 1 is shown in FIG. 1 in only a short section. The cable tray 1 has two side bars 2, 2.1 which are connected together by a bottom 3. The cable tray 1 is open on the top side but if desired it can be closed by a cover in order to form a cable tunnel in this way. The side bars 2, 2.1 in each case have an eye 4, 4.1 for the formation of their upper edge. In the embodiment example shown, the eye 4, 4.1 of each side bar 2, 2.1 is formed in the direction of the respective other side bar 2, 2.1 or 2. Thus, the outer sides 5, 5.1 of the eyes 4, 4.1 face one another. The cable tray 1 is a galvanized plate steel component. The bottom 3 and the side bars 2, 2.1 are not perforated in the embodiment example shown.

Not only is the cable tray 1 of the depicted embodiment example used for providing a potential equalization, but it also has an earth wire functionality. For this purpose, an earth wire 6 is mounted on the cable tray 1. The earth wire 6 is located on the inner side with respect to the volume formed by the cable tray 1, adjacent to the side bar 2. The earth wire 6 is held by multiple spring clamps 7 arranged spaced apart. In FIG. 1, two spring clamps 7 are arranged next to one another. This is for the purpose of explanation. In fact, the spring clamps 7 will be arranged at a certain spacing from one another, such as 90 to 110 cm, for example. Other spacings are naturally possible. For the provision of an earth wire branch line, a connection terminal 8 is connected to the earth wire 6.

The spring clamp 7 and the connection terminal 8 are described in further detail in the following FIGS. 2 to 4. The spring clamp 7 is a stamped bent part made of a spring steel. The spring clamp 7 has a side bar receptacle 9, namely for receiving the upper edge of the side bar 2, which is formed by the eye 4. The side bar receptacle 9 of the spring clamp 7 is laterally enclosed by two mounting arms 10, 10.1. In the depicted embodiment example, the mounting arms 10, 10.1 are connected together by a web 11, in each case with interposition of a curved section 12, 12.1. The side bar receptacle 9 is undercut, as can be seen especially in FIG. 3. The inlet 13 to the side bar receptacle 9 is formed by the narrowest spacing of the two mounting arms 10, 10.1. The mounting arms 10, 10.1 are inclined toward one another, whereby their spacing narrows from the direction of the side bar receptacle 9 toward the inlet 13. Here, it is provided that the mounting arm 10 is more inclined than the mounting arm 10.1 and namely with respect to a vertical plane, provided, for example, by the side bar 2.

In the depicted embodiment example, the mounting arm 10 is forked (see FIG. 2). The two fork extensions 14, 14.1 are spaced apart in longitudinal extension of the side bar 2. Each fork extension 14, 14.1 has an earth wire receptacle 15, 15.1. The two fork extensions 14, 14.1 are constructed identically. The following description of the fork extension 14 thus applies equally to the fork extension 14.1. The earth wire receptacle 15 is enclosed by two sections of one respective holding arm 16, 16.1. The sections of the holding arms 16, 16.1, which in the embodiment example shown in the figures are formed by a circular segment, are identified in the figures with reference numerals 17, 17.1. Two setting arm sections 18, 18.1 are formed on the sections 17, 17.1 of the holding arms 16, 16.1 which enclose the earth wire receptacle 15. The setting arm sections 18, 18.1 are inclined with respect to one another, wherein their spacing narrows in the direction of the insertion opening 19 of the earth wire receptacle 15. On their ends facing the setting arm sections 18, 18.1, the sections 17, 17.1 are connected together via a clamp spring section 20. The clamp spring section 20 comprises a curved section 21. Said curved section represents the hinge on which the two holding arms 16, 16.1 can be adjusted in a spring elastic manner with respect to one another. This applies in particular with regard to a widening movement during the insertion of an earth wire in the earth wire receptacle 15. The setting arm sections 18, 18.1 are used as setting bevels for the opening of the insertion opening 19, until the earth wire 6 passes through the insertion opening 19 and can spring into the earth wire receptacle 15. If the earth wire 6 is received in the earth wire receptacle 15, the sections 17, 17.1 bear against the lateral surface of the earth wire 6 with prestress. The earth wire diameter is therefore greater than the spacing of the sections 17, 17.1, as represented in FIG. 3, which shows the spring clamp 7 in unloaded state.

Due to its two fork extensions 14, 14.1, the spring clamp 7 has two earth wire receptacles 15, 15.1 formed on its mounting arms 10 or mounting arm parts. As can be seen particularly in FIG. 3, the mounting arm 10 transitions into the respective holding arms 16 and namely with interposition of a turned down section 22, by means of which the holding arm 16 with the curved section 21 formed thereon is brought into a spatial position such that its vertex facing left in FIG. 3 is arranged on the same side of the vertical 23 shown as a dot-dashed line in FIG. 3, as the narrow side formed by the mounting arm 10.1 at the inlet 13 of the side bar receptacle 9.

The connection terminal 8 is shown by itself in FIG. 4. The connection terminal 8 is a cuboid brass part made of a brass alloy having a sufficient electrical conductivity. The connection terminal 8 has an earth wire receptacle 24. It is laterally open. This facilitates mounting of the connection terminal 8 on the earth wire 6, when said earth wire is mounted on the cable tray 1. The earth wire receptacle 24 is offset in height with respect to the opening 25. In the earth wire receptacle 24, the earth wire 6 is held by a clamping screw not represented in FIG. 4. Said clamping screw meshes with its thread in an internally threaded bore 26 which passes through a top section 27 of the connection terminal 8, which covers the earth wire receptacle 24. A clamping screw inserted in the internally threaded bore 26, designed as a set screw, for example, acts on an earth wire inserted in the earth wire receptacle 24 in the direction of the height of the connection terminal 8, whereby the earth wire 6 is pressed against the lower-side wall of the earth wire receptacle 24. The connection terminal 8 of the depicted embodiment example has two connection bores 28, in which the earth wires of an earth wire to be connected to the connection terminal 8, typically earth wires of machines, can be connected. The earth wires inserted in a connection bore 28 of this kind are also secured by means of clamping screws which mesh with the thread of an internally threaded bore 29 and thus act by means of their foot on the earth wire sections inserted in the connection bores 28, whereby said earth wire connections are mechanically secured in the connection bores 28 and the desired electrical contacting is established by the connection terminal 8.

Figure 5:
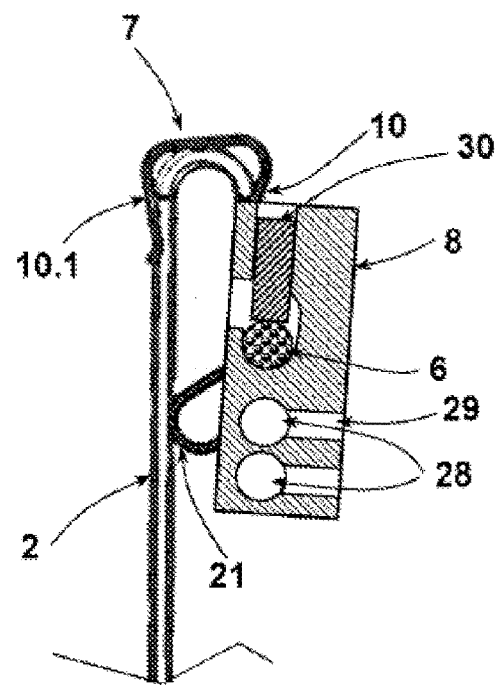
FIG. 5 shows a cross-sectional view of the left portion of the cable tray of FIG. 1.

FIG. 5 shows, in a cross-sectional representation, the spring clamp 7 placed on the upper edge of the side bar 2, which is provided by the eye 4. Due to the design of the spring clamp 7, as described with regard to FIGS. 2 and 3, the curved section 21 of the holding arm 16 is braced under prestress on the inner side of the side bar 2. The inner sides of the mounting arms 10, 10.1 also act against the side bar 2 or its eye 4, wherein the mounting arm 10 acts against the outer side 5 of the eye 4. Between the two fork extensions 14, 14.1, the connection terminal 8 is mounted. The clamping screw which meshes with the internally threaded bore 26 and secures the earth wire 6 is identified in FIG. 5 with reference numeral 30. The cross-sectional representation of FIG. 5 illustrates that the connection terminal 8 by means of its top section 27 engages under the lower edge of the eye 4. Preferably, the connection terminal 8 is designed so that, by means of the clamping screw 30, not only is the earth wire 6 held clamped in the earth wire receptacle 24, but also the upper side of the top section 27 engaging under the eye 4 also acts with a certain prestress against the lower edge of the eye 4. Thus, the electrical contact surface between the connection terminal 8 and the cable tray 1 is increased. However, it is particularly advantageous that, due to the connection terminal 8 engaging under the eye 4, the spring clamp 7 is locked on the upper edge of the side bar 2 of the cable tray 1.

In an embodiment not represented in the figures, for achieving such locking, connection terminals can also be used, which consist only of the upper part comprising the connection receptacle 24. Said connection terminals are then used not for providing branch lines, as explained with regard to connection terminal 8 with its connection bores 28, but rather for the locked connection of the spring clamps on the cable tray 1.

Such a connection as well as the bracing under prestress of the spring clamp 7 by its curved section 21 on the inner side of the side bar 2, and namely spaced from the mounting receptacle 9 in the direction of the height, represents a stable multi-point securing, so that the use of such spring clamps 7 for holding an earth wire 6 is also suitable in high-vibration environments. The additional locking by means of a connection terminal 8, as described, accordingly improves the connection.

Figure 6:
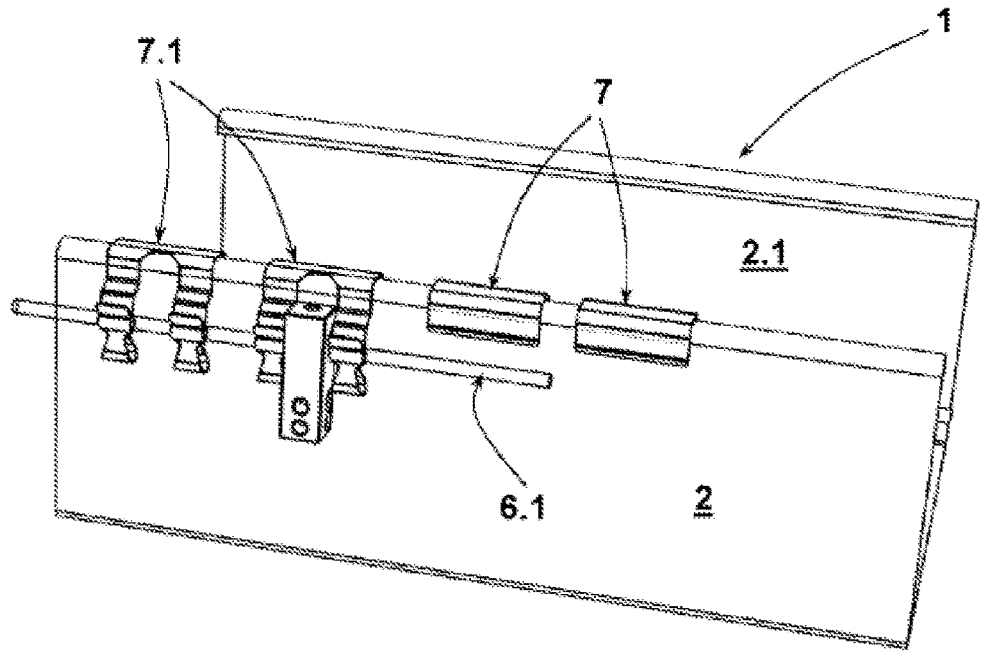
FIG. 6 shows a perspective view of the tray of FIG. 1 onto the outer side of the left side bar in FIG. 1.
Figure 7:
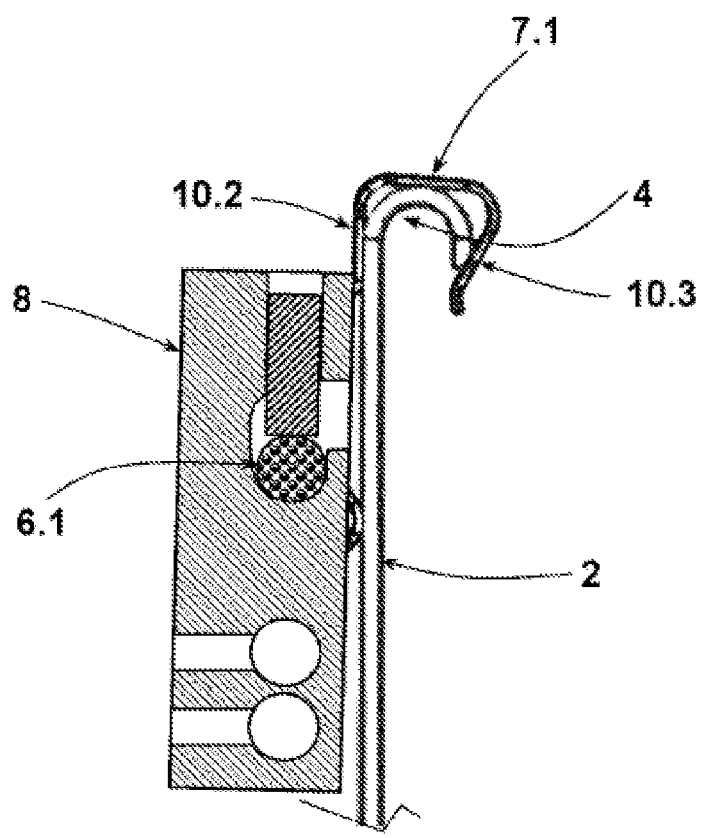
FIG. 7 shows a cross-sectional view through the outer-side earth wire holder.

FIG. 6 shows a perspective view onto the outer side of the cable tray 1 which, for illustration, also supports an earth wire 6.1 on the outer side of the side bar 2. The earth wire 6.1 is analogously connected on the upper edge of the side bar 2 using spring clamps 7.1, as described with regard to the earth wire 6 using the spring clamps 7. The spring clamps 7.1 differ from the spring clamps 7 only in that the fork extensions 14, 14.1 are connected on the exterior mounting arms 10.2 and not on the interior mounting arms 10.3. The stable bracing is also ensured in this spring clamp 7.1 on the outer side of the side bar 2.

In the described cable tray 1, it is particularly advantageous that such a cable tray is suitable without any special features adapted to an earth wire mounting, in order to mount an earth wire thereon by means of the described spring clamps 7, 7.1. The same applies to the provision of branch lines on the earth wire 6, 6.1, which can be provided by means of the connection terminals 8. Therefore, the present disclosure also extends to an earth wire kit comprising a plurality or a multitude of such spring clamps 7, 7.1 and a multitude or a plurality of the described connection terminals 8.

The invention has been described using embodiment examples. Without departing the scope of the claims, numerous other embodiments, modifications and possibilities arise for a person skilled in the art for practicing the invention, without these having to be shown or explained in greater detail in the context of this disclosure.

LIST OF REFERENCE NUMERALS

1 Cable tray
2, 2.1 Side bar
3 Bottom
4, 4.1 Eye
5, 5.1 Outer side
6, 6.1 Earth wire
7, 7.1 Spring clamp
8 Connection terminal
9 Side bar receptacle
10, 10.1, 10.2, 10.3 Mounting leg
11 Web
12, 12.1 Curved section
13 Inlet
14, 14.1 Fork extension
15, 15.1 Earth wire receptacle
16, 16.1 Holding arm
17, 17.1 Section
18, 18.1 Setting arm section
19 Insertion opening
20 Clamp spring section
21 Curved section
22 Locking section
23 Vertical
24 Earth wire receptacle
25 Opening
26 Internally threaded bore
27 Top section 28 Connection bore
29 Internally threaded bore
30 Clamping screw

The invention claimed is:

1. A cable tray comprising:
two spaced-apart side bars and at least one earth wire holder, wherein the at least one earth wire holder is in the form of a spring clamp, each spring clamp having a side bar receptacle enclosed by two mounting arms for connecting the spring clamp to an upper edge of a side bar and having an undercut earth wire receptacle enclosed by two holding arms,
wherein, when the spring clamp is mounted on the upper edge of the side bar, the mounting arms bear against the side bar under prestress, and the spacing between the holding arms in the section thereof enclosing the earth wire receptacle is smaller than the diameter of an earth wire to be introduced therein,
wherein the spring clamp is designed forked with two earth wire receptacles spaced apart in longitudinal extension of the cable tray by a gap, and in the gap provided by the forking of at least one spring clamp, a connection terminal is arranged for connection to the earth wire.

2. The cable tray of claim 1, wherein on the side bar supporting the at least one spring clamp, the upper edge is formed as an eye, and the mounting arm bearing against an outer side of the eye is more inclined with respect to the plane of the side bar than the other mounting arm and thereby at least to some extent engages under the eye.

3. The cable tray of claim 1, wherein, when the spring clamp is mounted on the side bar, the spring clamp is braced with one of the holding arms thereof under prestress against the side bar with spacing with respect to the upper edge of the side bar.

4. The cable tray of claim 1, wherein at least one connection terminal is mounted on the earth wire connected to the side bar.

5. The cable tray of claim 1, wherein the connection terminal has an earth wire receptacle which is open in the direction of the side bar as well as a clamping means acting on the earth wire inserted therein.

6. The cable tray of claim 5, wherein the clamping means is a clamping screw.

7. The cable tray of claim 6, wherein the clamping screw is a set screw.

8. The cable tray of claim 6, wherein the clamping screw acts in the direction of the height of the side bar or the connection terminal.

9. The cable tray of claim 8, wherein the upper edge of the side bar is formed as an eye, the earth wire is located on a side of the side bar facing in the direction in which the eye is formed, and the connection terminal engages under the eye of the side bar.

10. The cable tray of claim 1, wherein an earth wire is connected to at least one side bar by the at least one earth wire holder.

11. The cable tray of claim 1, wherein one of the two holding arms of the earth wire holder is formed on one of the two mounting arms.

12. The earth wire holder according to claim 1, wherein the holding arms of the earth wire holder each have a setting arm section, and wherein a spacing between the setting arm sections is reduced in the direction of an inlet of the undercut earth wire receptable.

13. The earth wire holder according to claim 1, wherein the holding arms of the earth wire holder are connected together via a clamp spring section.

14. The earth wire holder according to claim 1, wherein the side bar receptacle is undercut by the mounting arms arranged inclined toward one another.

15. The earth wire holder according to claim 1, wherein the two mounting arms enclosing the side bar receptacle are connected by a web, and the web bears against the upper edge of the side bar when the spring clamp is mounted on the side bar.

16. The earth wire holder according to claim 1, wherein:
the holding arms of the earth wire holder are connected together via a clamp spring section;
opposite the clamp spring section with respect to the earth wire receptable, the holding arms each have a setting arm section, and a spacing between the setting arm sections is reduced toward an inlet of the earth wire receptable;
the two mounting arms enclosing the side bar receptacle are connected by a web, and the web bears against the upper edge of the side bar when the spring clamp is mounted on the side bar; and
the side bar receptacle is undercut by the mounting arms arranged inclined toward one another.

* * * * *